US008215718B2

(12) United States Patent
Waldner

(10) Patent No.: US 8,215,718 B2
(45) Date of Patent: Jul. 10, 2012

(54) MULTI-POSITION END GATE ASSEMBLY

(76) Inventor: Joseph Waldner, Minnedosa (CA)

( * ) Notice: Subject to any disclaimer, the term of this patent is extended or adjusted under 35 U.S.C. 154(b) by 202 days.

(21) Appl. No.: 12/718,369

(22) Filed: Mar. 5, 2010

(65) Prior Publication Data
US 2011/0215633 A1  Sep. 8, 2011

(51) Int. Cl.
B60P 1/28 (2006.01)
E05D 15/50 (2006.01)
E05C 1/08 (2006.01)
(52) U.S. Cl. .................... 298/23 M; 298/17 R
(58) Field of Classification Search ............... 298/23 M, 298/23 S, 23 A, 23 R, 17 R; 296/186.4, 50, 296/57.1, 182.1, 183.2, 183.1, 60, 146.8, 296/146.11, 146.12; B60P 1/28; E05D 15/50; E05C 1/08
See application file for complete search history.

(56) References Cited

U.S. PATENT DOCUMENTS

| 1,371,036 | A |   | 3/1921  | Le Force |
| 2,806,735 | A | * | 9/1957  | Smith ............................ 296/51 |
| 4,024,671 | A | * | 5/1977  | Isobe ............................ 49/104 |
| 4,691,956 | A | * | 9/1987  | Hodge ............................ 296/51 |
| 5,823,630 | A | * | 10/1998 | Graham ....................... 298/23 S |
| 6,217,123 | B1 | * | 4/2001 | Palmberg, Jr. .......... 298/23 MD |
| 6,764,130 | B1 |   | 7/2004 | Hull |
| 6,827,386 | B2 |   | 12/2004 | Stevenson |

* cited by examiner

Primary Examiner — Glenn Dayoan
Assistant Examiner — Sunsurraye Westbrook
(74) Attorney, Agent, or Firm — Ryan W. Dupuis; Kyle R. Satterthwaite; Ade & Company Inc.

(57) ABSTRACT

An end gate assembly of a dump box comprises an end gate panel supported for pivotal movement about a lower pivot axis of a pair of lower latch assemblies in a first released position and about an upper pivot axis of a pair of upper latch assemblies in a second released position. A common actuator is arranged to release both upper latch assemblies in the first released position of the actuator and is arranged to release both lower latch assemblies in the second released position. The common actuator communicates between the latch assemblies on opposing sides of the end gate panel through a connecting member extending across the gate opening below a floor of the dump box.

20 Claims, 5 Drawing Sheets

US 8,215,718 B2

MULTI-POSITION END GATE ASSEMBLY

This application claims foreign priority benefits from Canadian Patent Application 2,691,672 filed Feb. 4, 2010.

FIELD OF THE INVENTION

The present invention relates to a multi-position end gate assembly in which the end gate comprises an actuator arranged to release upper latches such that the end gate panel is pivotal about a lower pivot axis in a first released position and arranged to release lower latches such that the end gate panel is pivotal about an upper pivot axis in a second released position, and more particularly the present invention relates to a multi-position end gate assembly which is suited for use on a dump box.

BACKGROUND

On a dump box for trucks and trailers, it is typical to provide an end gate which hinges at the top corners of the gate such that the bottom end of the gate opening can be opened when dumping from the rear edge of the dump box. In some instances however, it is desirable to hinge the end gate at the bottom thereof for unrestricted access through the top of the gate opening to the cargo area of the dump box. It is thus desirable for the end gate panel to pivot from a closed position to an upward position pivoted along an upper horizontal axis or to a lower position pivoted along a lower horizontal axis.

U.S. Pat. Nos. 6,827,386 by Stevenson, 6,764,130 by Hull and 1,371,036 by Le Force describe various examples of end gate panels which can be pivoted into different positions. In each instance however separate actuation is required for releasing the end gate into either one of the upper or lower positions thereof. Hull in particular requires manually releasing each side of the gate panel separately so as to be time consuming and potentially unsafe where the operator must cross the path of the material being dumped from the cargo box. Le Force describes releasing both sides of the gate simultaneously, however different releasing mechanisms are required for actuating release of the gate panel into the upper and lower positions respectively. Furthermore, the latches are complex in configuration and are not well suited for heavy duty applications. Stevenson also requires separate actuators for releasing the gate panel into the upper and lower positions respectively. Furthermore the actuator handles are situated at a central location in the gate panel so as to position the operator in the path of material being dumped from the box in an unsafe manner.

SUMMARY OF THE INVENTION

According to one aspect of the invention there is provided an end gate assembly for a cargo box comprising a bed floor extending in a longitudinal direction between a front end and a rear end, a pair of sidewalls extending in the longitudinal direction along opposing sides of the bed floor to respective rear ends defining a gate opening therebetween at the rear end of the bed floor, the end gate assembly comprising:

an end gate panel arranged to span between opposing ends in a lateral direction across the gate opening between the rear ends of the sidewalls of the cargo box;

a pair of upper latch assemblies arranged to couple respective opposing ends of the end gate panel to respective ones of the rear ends of the sidewalls adjacent a top of the end gate panel in a latched position of the upper latch assemblies;

a pair of lower latch assemblies arranged to couple respective opposing ends of the end gate panel to respective ones of the rear ends of the sidewalls adjacent a bottom of the end gate panel in a latched position of the lower latch assemblies;

an actuator coupled to the upper latch assemblies and the lower latch assemblies;

the actuator being movable from a neutral position in which the upper and lower latch assemblies are in the latched position to either one of a first released position or a second released position;

said actuator being arranged to release both upper latch assemblies in the first released position such that the end gate panel is pivotal about a lower pivot axis spanning in the lateral direction across the bottom of the end gate panel between the lower latch assemblies; and said actuator being arranged to release both lower latch assemblies in the second released position such that the end gate panel is pivotal about an upper pivot axis spanning in the lateral direction across the top of the end gate panel between the upper latch assemblies.

By providing a single actuator which can be coupled to both the upper and lower latch assemblies, a simplified structure using a single actuator readily permits releasing the gate panel into either one of the first or second released positions so that the gate panel can be pivoted downwardly or upwardly respectively as readily controlled by the operator. Use of a single actuator further permits the actuator to be readily situated at one side of the gate opening so that the operator is not in the path of material being dumped from the box. The handle of the single actuator can be arranged in an intuitive manner such that downward displacement of the actuator handle permits downward opening of the gate while upward movement of the actuator handle permits upward pivoting of the gate in a manner which is unseen in the prior art.

The actuator preferably comprises an actuator handle which is movable from the neutral position in two opposing directions towards the first released position and the second released position respectively.

Preferably the actuator handle is supported on one side of the gate opening and is coupled to the upper and lower latch assemblies on both sides of the gate opening.

Preferably the actuator includes a connecting member connected between the upper and lower latch assemblies on one side of the gate opening and the upper and lower latch assemblies on the other side of the gate opening, the connecting member being arranged to extend across the gate opening below the bed floor of the cargo box.

The connecting member may be rotatable between the neutral position and the released positions about a longitudinal axis of the connecting member which extends in the lateral direction of the upper and lower pivot axes.

When the cargo box comprises lower frame members supporting the bed floor thereon, preferably the connecting member is arranged to extend through the lower frame members.

The end gate panel preferably comprises an upper pivot shaft projecting laterally outward from each end of the end gate panel adjacent the top thereof and a lower pivot shaft projecting laterally outward from each end of the end gate panel adjacent the bottom thereof. In this instance the upper pivot shafts are received in the upper latch assemblies in the latched position thereof to define the upper pivot axis and the lower pivot shafts are received in the lower latch assemblies in the latched position thereof to define the lower pivot axis.

Preferably each latch assembly comprises a fixed portion and a movable portion arranged to selectively retain the respective pivot shaft on the fixed portion in which the movable portion is vertically slidable from the latched position to a respective released position.

The actuator may further comprise an upright member supported at each end of the end gate panel in connection between a respective one of the upper latch assemblies and a respective one of the lower latch assemblies such that each upper latch assembly is movable into the released position only when the respective upright member of the actuator is displaced downwardly and each lower latch assembly is movable into the released position only when the respective upright member of the actuator is displaced upwardly.

The actuator may further comprise a connecting member spanning in the lateral direction between opposing sides of the gate opening below the bed floor and a crank arm at each end of the connecting member which is coupled to a respective one of the upright members such that pivotal movement of the connecting member in a first direction from the neutral position causes downward displacement of the upright members into the first released position and such that pivotal movement of the connecting member in a second direction from the neutral position causes upward displacement of the upright members into the second released position.

Preferably each upper latch assembly more particularly comprises a fixed portion having a slot extending generally horizontally outward in the longitudinal direction of the cargo box so as to be arranged to slidably receive the respective pivot shaft therein as the end gate panel is pivoted about the lower pivot axis into a closed position spanning the gate opening and a movable portion arranged to selectively retain the respective pivot shaft in the slot in the fixed portion in which the movable portions of the upper latch assemblies are movable together into the first released position by the actuator.

The movable portions of the upper latch assemblies may be vertically slidable upwardly into the latched position and downwardly into respective released positions and are preferably biased into the latched position.

The movable portion of each upper latch assembly may further comprise a cam face arranged to displace the movable portion against the biasing into the released position as the respective pivot shaft is returned to the closed position of the end gate panel.

Preferably each lower latch assembly more particularly comprises a fixed portion having a slot extending generally horizontally outward in the longitudinal direction of the cargo box so as to be arranged to slidably receive the respective pivot shaft therein as the end gate panel is pivoted about the upper pivot axis into a closed position spanning the gate opening and a movable portion arranged to selectively retain the respective pivot shaft in the slot in the fixed portion in which the movable portions of the lower latch assemblies are movable together into the second released position by the actuator.

The movable portions of the lower latch assemblies may be vertically slidable downwardly into the latched position and upwardly into respective released positions and are preferably biased into the latched position.

The movable portion of each lower latch assembly may further comprise a cam face arranged to displace the movable portion against the biasing into the released position as the respective pivot shaft is returned to the closed position of the end gate panel.

The end gate assembly may be used in combination with a cargo box comprising a dump box including a base frame arranged to be fixed in relation to a respective vehicle frame and a dump box frame supporting the bed floor for pivotal movement relative to the base frame between a transport position and a dumping position. In this instance, the connecting member of the actuator is preferably connected between the upper and lower latch assemblies on one side of the gate opening and the upper and lower latch assemblies on the other side of the gate opening by extending across the gate opening below the bed floor through the dump box frame.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
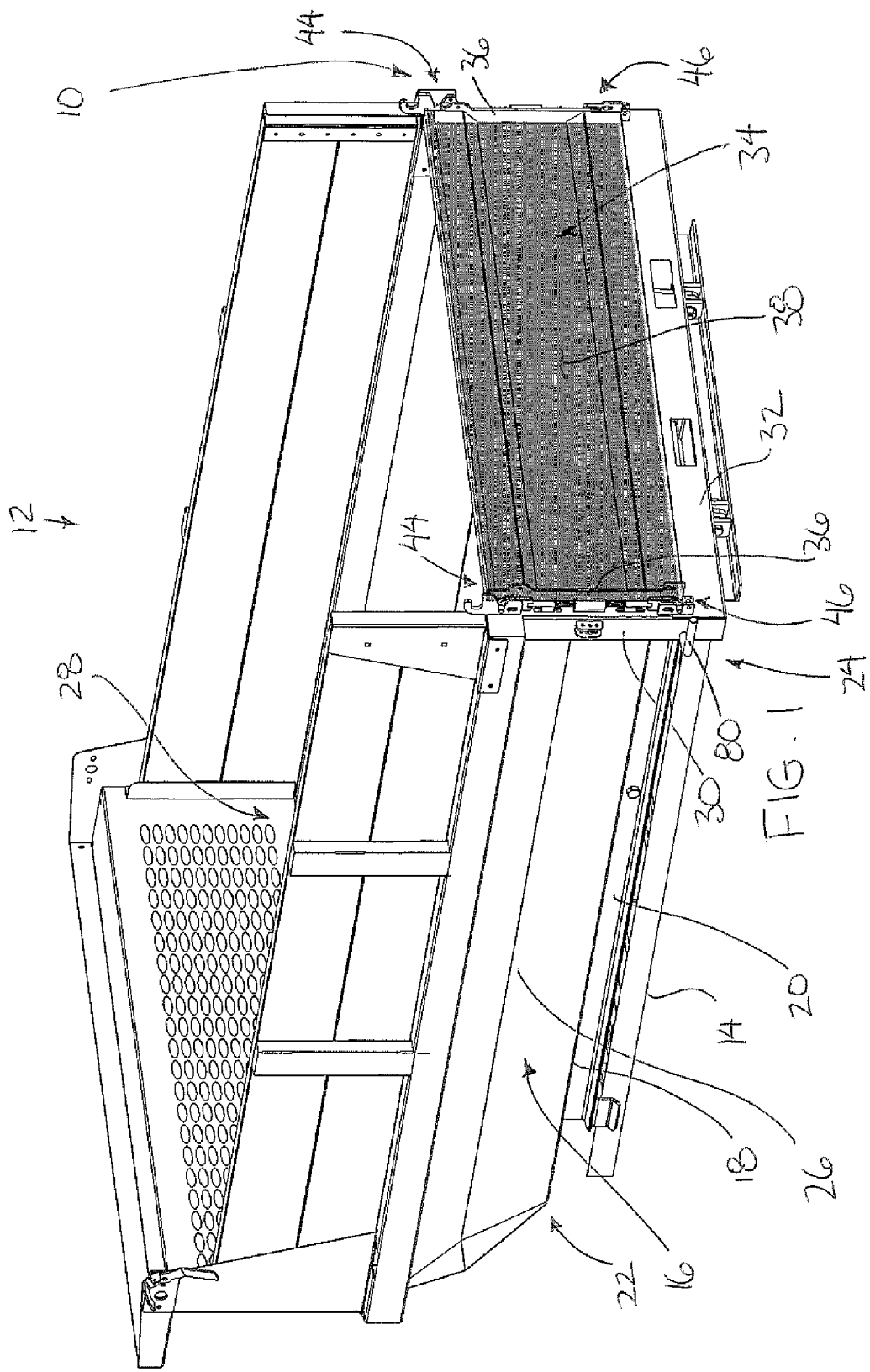
FIG. 1 is a perspective view of a dump box insert for mounting on the rear of a truck in which the end gate assembly is supported on the dump box in a closed position of the end gate panel.
Figure 2:
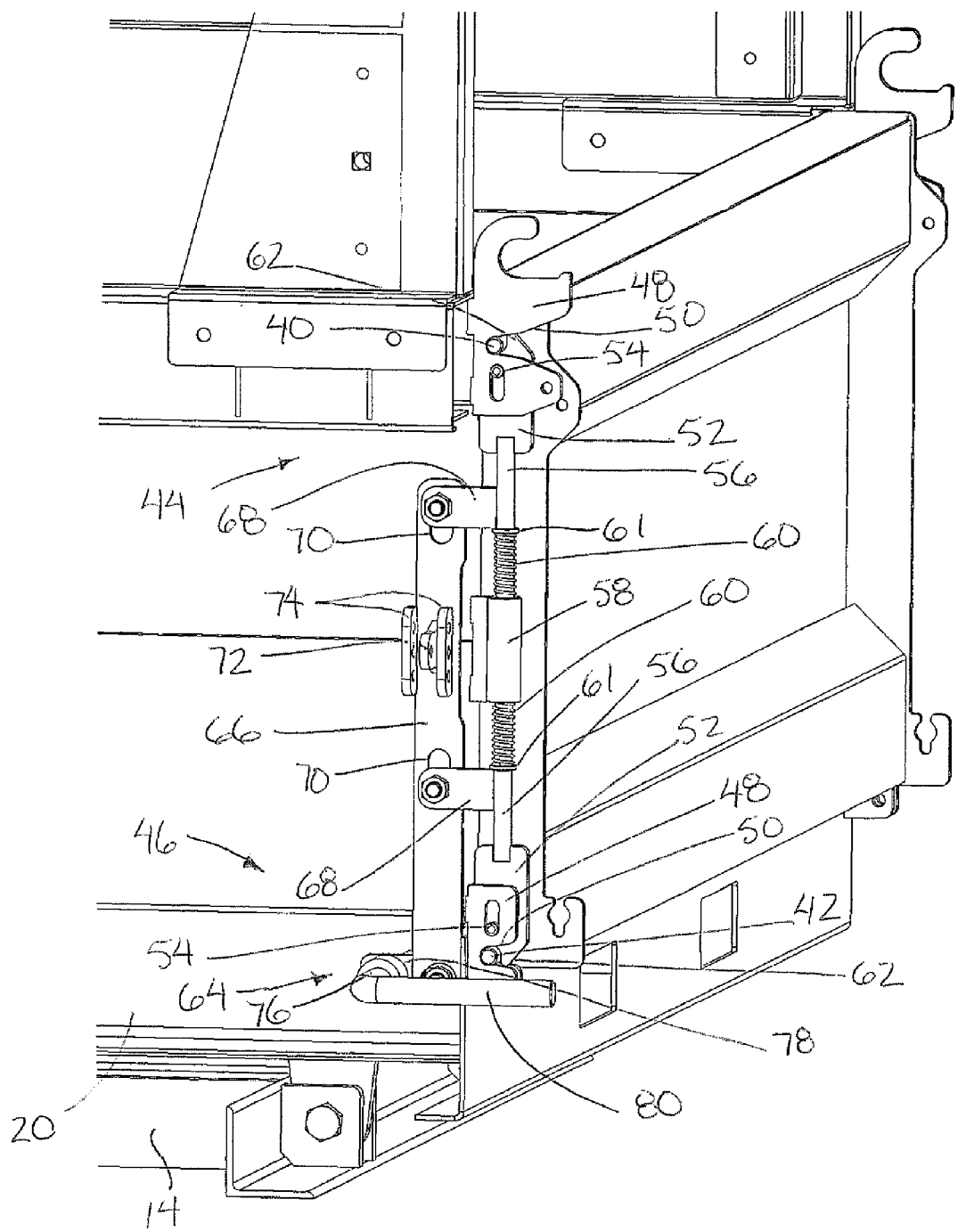
FIG. 2 is an enlarged perspective view of the end gate assembly of FIG. 1 in which a portion of the side walls of the dump box are shown removed.
Figure 3:
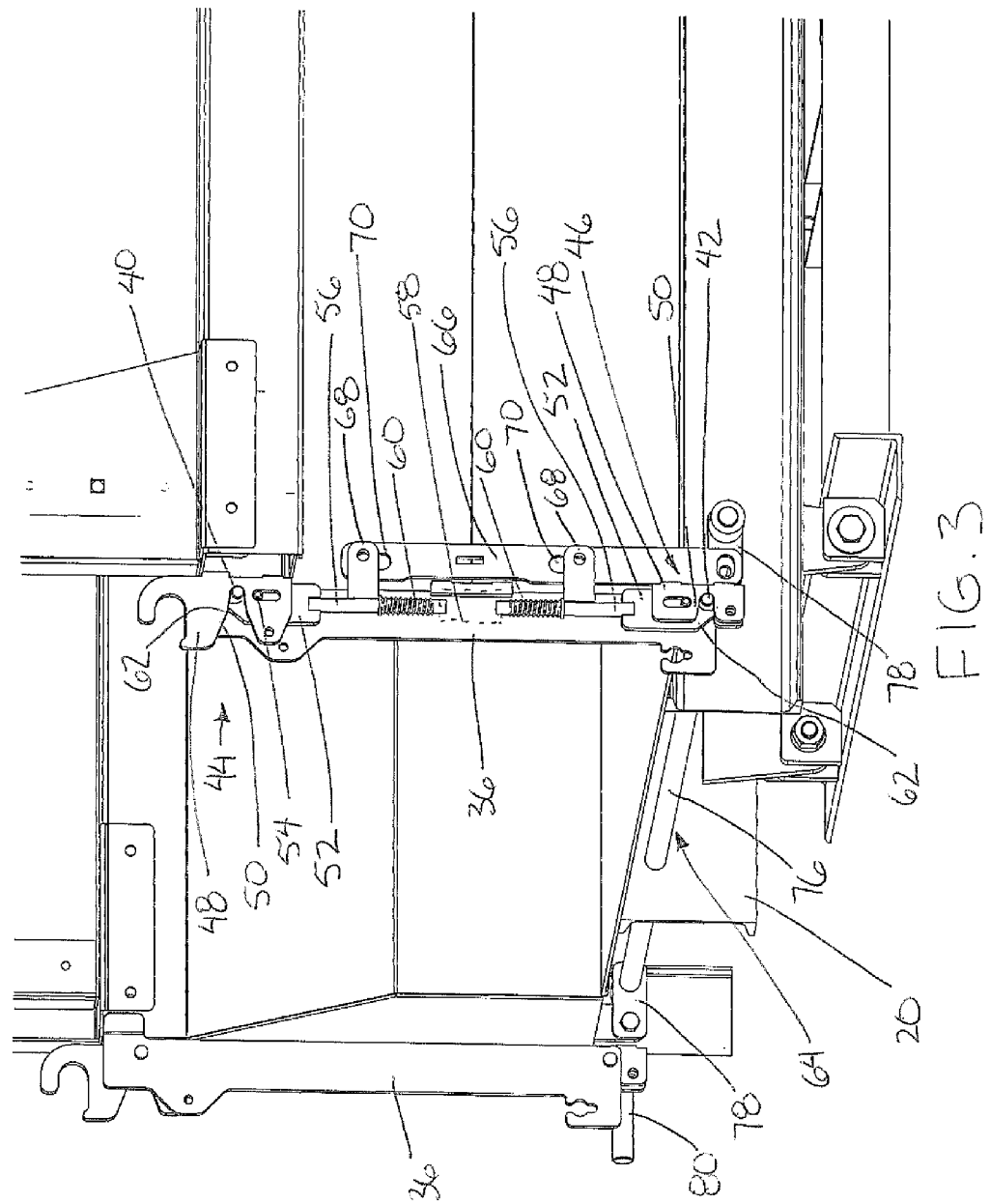
FIG. 3 is a perspective view of the end gate assembly from an opposing side of the dump box in relation to FIG. 2 in which a central portion of the end gate panel and a portion of the dump box are shown removed.
Figure 4:
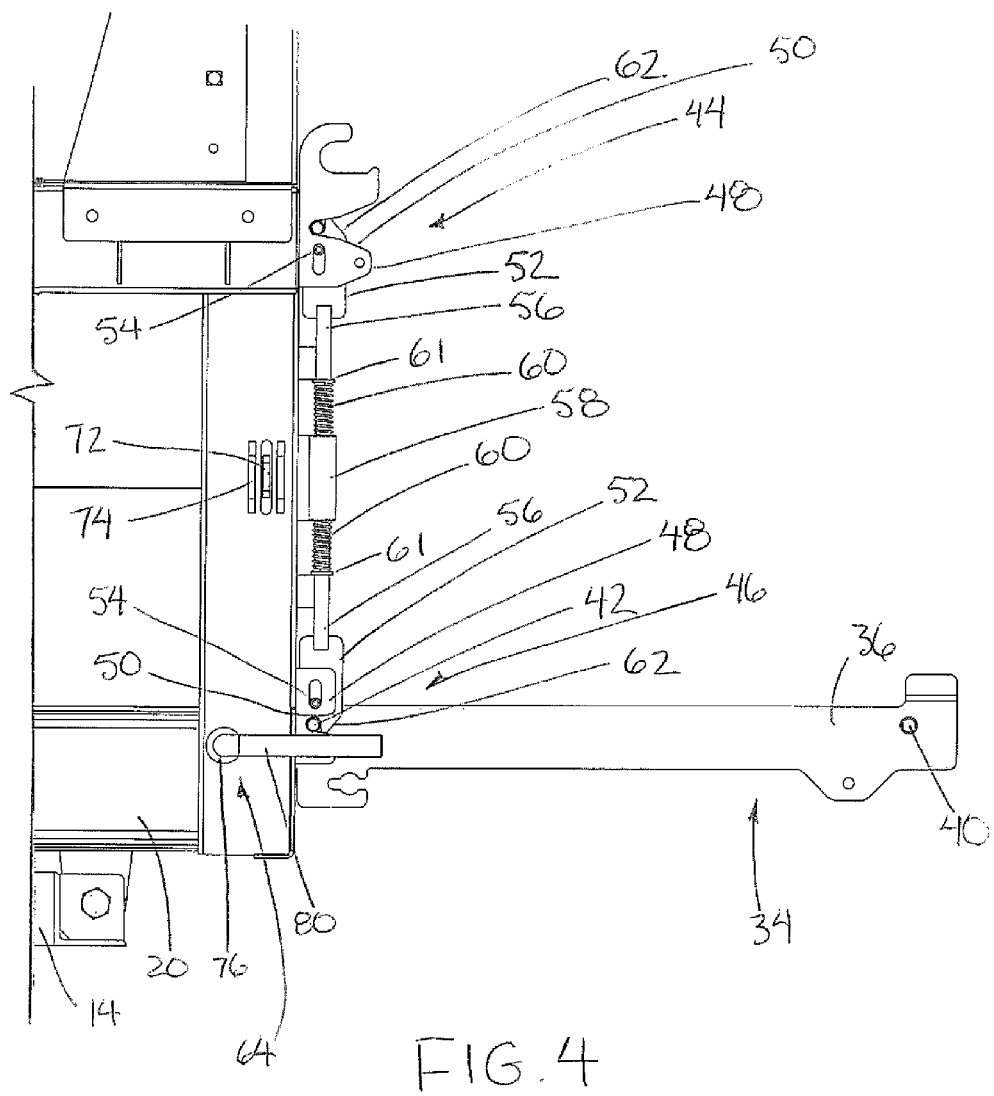
FIG. 4 is a side elevational view of the end gate panel pivoted into a first open position.
Figure 5:
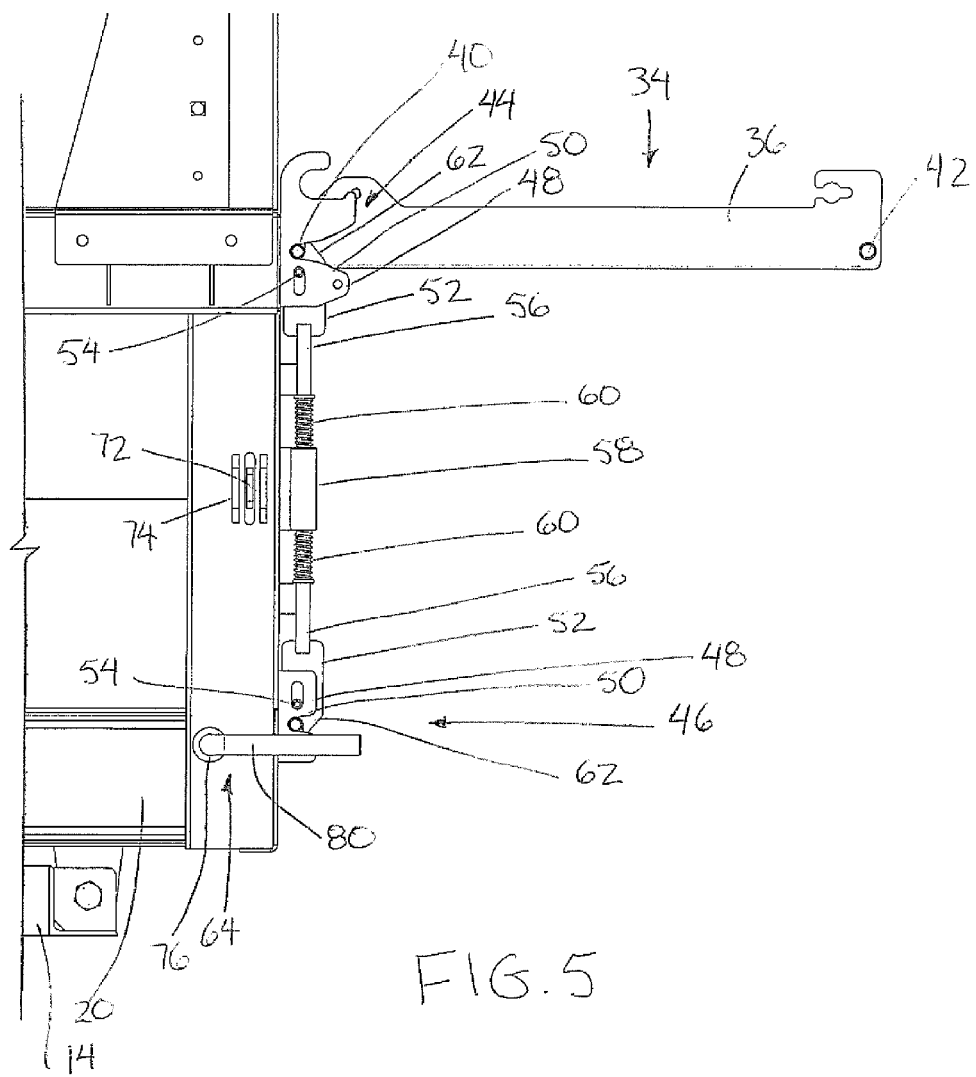
FIG. 5 is a side elevational view of the end gate panel pivoted into a second open position.

Referring to the accompanying figures there is illustrated an end gate assembly generally indicated by reference numeral 10. The assembly 10 is well suited for use with a cargo box, for example a dump box insert 12 of the type shown in the illustrated embodiment which can be readily mounted into the cargo bed of a conventional truck. The end gate assembly 10 is operable with a single actuator to permit displacement from a closed position spanning across a respective gate opening of the end gate assembly to either one of a first open position in which the end gate panel is pivoted downwardly about a lower pivot axis or a second open position in which the end gate is pivoted upwardly about an upper pivot axis.

The dump box insert 12 of the illustrated embodiment comprises a base frame 14 arranged to be mounted in fixed arrangement to the floor of a flat bed or cargo box of a truck. The dump box insert further comprises a dump box 16 comprising a respective dump box frame which is pivotally coupled to the base frame 14 for relative pivotal movement about a horizontal axis adjacent the rear end thereof between a generally horizontal transport position and an upwardly inclined dumping position.

The dump box frame supports a bed floor 18 on respective lower frame members 20 such that the horizontal panel of the bed floor spans generally horizontally in the transport position in a longitudinal direction from a front end 22 to a rear end 24 of the dump box. The dump box further comprises side walls 26 which are upright and which span in the longitudinal direction along opposing sides of the bed floor to extend upwardly therefrom and to extent in the longitudinal direction from the front end to respective rear ends of the side walls which define the gate opening at the rear end of the dump box spanning therebetween. The dump box further comprises a front wall 28 spanning upwardly from the front end of the bed floor between the front ends of the two side walls 26. The dump box frame further comprises a pair of side members 30 which are upright in orientation at the rear ends of the side walls and a bottom member 32 spanning between the two side members along the bottom of the gate opening such that the two side members 30 and the bottom member 32 define a portion of the perimeter of the gate opening.

The end gate assembly 10 comprises an end gate panel 34 which is arranged to be supported on the rear ends of the two side walls 26 for pivotal movement in relation thereto from the closed position to either one of the first or second open positions. In the closed position, the end gate panel spans in a lateral direction between two end walls 36 which are generally vertical in orientation and parallel to one another at the opposing ends of the gate panel adjacent the two side members 30 of the dump box frame respectively. The end gate panel 34 further comprises a main panel 38 which is upright and vertical when the gate panel is closed so as to span in the lateral direction perpendicularly to the two end walls 36 joined at the opposing ends thereof. Upper and lower frame members also span in the lateral direction along the top and bottom edges of the main panel for additional structural support between the two opposing end walls 36 of the panel.

The end gate panel further comprises a pair of upper pivot shafts 40 and a pair of lower pivot shafts 42 fixedly mounted thereon. The two upper pivot shafts are mounted on the opposing end walls 36 respectively adjacent the top end of the gate panel such that the two upper pivot shafts define a common upper pivot axis extending in the lateral direction along the top of the gate panel about which the gate panel is pivoted in the second open position thereof.

Similarly the two lower pivot shafts 42 are mounted on the opposing end walls 36 of the gate panel respectively adjacent the bottom end thereof to project outwardly in the lateral direction and define a common lower pivot axis about which the end gate panel is pivoted in the first open position.

The end gate assembly 10 comprises two upper latch assemblies 44 mounted on the rear ends of the two side walls 26 adjacent the top end thereof for selectively retaining respective ones of the two upper pivot shafts 40 therein in the closed position and the second open position. The assembly 10 further comprises two lower latch assemblies 46 also supported on the ends of the side walls 26, but adjacent the bottom thereof so as to be suited for alignment with the two lower pivot shafts 42 respectively. The two lower latch assemblies 46 serve to retain the respective ones of the two lower pivot shafts 42 therein in the closed position and the first open position of the gate panel.

Each of the latch assemblies comprises a fixed portion 48 comprising a vertical plate which is parallel to the forward direction of the vehicle upon which the dump box insert is supported so as to be also parallel to the longitudinal direction of the dump box. Each fixed portion includes a slot 50 formed therein which extends generally horizontally rearward from a forward terminal end of the slot to a mouth at the rear end of the vertical plate forming the fixed portion where the slot is wider in vertical dimension in the terminal end. The slot 50 is thus suited for guiding sliding movement of the respective pivot shaft therein as the gate is pivoted from a respective one of the open positions to the closed position. In the closed position the pivot shaft is snugly received within the forward terminal end of the respective slot.

Each latch assembly further comprises a moveable portion 52 which serves to selectively retain the respective pivot shaft within the respective slot 50 of the fixed portion. The moveable portion 52 also comprises a vertical plate which is parallel to the fixed portion 48 and is supported for vertical sliding movement in relation to the fixed portion. A vertical guide slot in the fixed portion below the main slot 50 receives a guide pin 54 fixed onto the moveable portion 52. The guide pin of each moveable portion is vertically slidable with the movable portion relative to the slot in the fixed portion to assist in guiding the vertical sliding movement of the movable portion relative to the fixed portion.

The upper latch assemblies 44 are arranged such that the moveable portions comprise an open ended U-shaped notch at the top end of the moveable portion for selectively receiving the respective pivot shaft therein as the moveable portion is displaced upwardly. The moveable portion 52 is arranged to be biased upwardly into engagement with the pivot shaft into a latched position. Slidably displacing the moveable portion downwardly serves to disengage the moveable portion from the respective pivot shaft such that the pivot shaft is horizontally slidable in the slot 50 of the fixed portion for pivoting movement of the gate panel into the respective open position.

The lower latch assemblies are similarly arranged to the upper latch assemblies however the moveable portions are instead supported above the respective pivot shafts such that the open ended U-shaped notch is formed in the bottom end of the moveable portion. A biasing mechanism biases sliding movement of the moveable portions 52 of the lower latch assemblies downwardly into engagement with the pivot shaft. Upward sliding movement of the moveable portions of the lower latch assemblies cause the moveable portions to be displaced from a latched position in engagement with the pivot shaft to a released position in which the pivot shaft is slidably removable from the slot 50 as the gate is pivoted into the respective open position from the closed position.

Each moveable portion 52 of each latch assembly includes a shaft portion 56 which extends inwardly from the respective moveable portion towards the other latch assembly at the same side in relation to the gate opening. At each side of the gate opening the resulting two shaft portions 56 extend inwardly towards one another to respective free ends which remain spaced apart from one another and which are vertically slidable within a surrounding guide tube 58 fixed onto the respective side member 30 of the dump box frame. The guide tube 58 operates together with the guide pins 54 to guide vertical sliding movement of the moveable portions of the latch assemblies respectively.

The biasing mechanism comprises a spring 60 mounted along each shaft portion 56 between the corresponding end of the respective guide tube 58 and a support flange 61 fixed on the shaft portion at an intermediate location thereon. Each of the springs 60 is supported under compression such that the moveable portions are biased outwardly away from the guide tube. More particularly, the moveable portions of the upper latch assemblies are biased upwardly and the moveable portions of the lower latch assemblies are biased downwardly.

As described herein, each moveable portion of each latch assembly is vertically slidable between a latched position in which the notch in the moveable portion retains the pivot shaft within the respective fixed portion and a released position in which the moveable portion is slidably displaced relative to the fixed portion to be disengaged with the respective pivot shaft permitting the gate panel to be pivoted into the respective released positions. When the upper latch assemblies are released, the lower latch assemblies remain latched such that the gate panel is pivotal about the lower pivot axis of the lower pivot shafts from the closed position to a first released position of the end gate assembly. Similarly when the two lower latch assemblies are released into a second released position of the end gate assembly by displacing the moveable portions thereof into disengagement with the respective lower pivot shafts, the end gate is pivotal about the upper pivot axis defined by the upper pivot shafts into the second open position of the gate panel.

Each of the moveable portions includes a rear edge in alignment with the slot 50 in the latched position which is inclined forwardly and inwardly. In particular the moveable portions of the lower latch assemblies include cam faces 62 inclined upwardly and forwardly and the upper latch assemblies include cam faces 62 which are sloped forwardly and downwardly to the inner edges of the plates forming the moveable portions. In this arrangement as the respective pivot shafts are displaced from the respective open position to the closed position to the closed position of the end gate panel, contact of the pivot shaft with the respective cam face 62 automatically displaces the moveable portion against the biasing mechanism to release the latch assembly, until the pivot shaft reaches the forward terminal end of the slot 50, at which point the biasing mechanism returns the moveable portion to the latched position to automatically retain the pivot shafts in the latched position as the gate panel is closed.

An actuator 64 for releasing the latch assemblies comprises an upright member 66 supported at each side of the gate opening within a hollow interior of the respective side member 30 of the dump box frame. The upright member 66 is supported for generally vertical movement from a neutral position connected to the corresponding upper latch assembly and corresponding lower latch assembly in the latched positions thereof to either one of the first released position or second released position of the actuator. More particularly each of upright member 66 is displaced upwardly into the second released position and is displaced downwardly into the first released position.

Each upright member 66 is coupled to the shaft portions 56 of the moveable portions of the two latch assemblies at the same side of the gate opening by a pair of link arms 68 of the actuator. Each link arm is fixed onto the shaft portion 56 to extend forwardly in the longitudinal direction to respective forward ends coupled to the respective upright member 66. A pair of vertical slots 70 in each upright member receives a coupling pin at the forward end of each link arm 68 slidably therein.

The slots 70 are positioned such that in the neutral position of the upright member the coupling pins of the upper link arms 68 are located at the top ends of the upper slots, while the coupling pins of the lower link arms are located at the bottom ends of the lower slots. In this arrangement upward displacement of the upright member only causes displacement of the lower latch assemblies upwardly into the released position; however the coupling pins of the upper latch assemblies merely slide within the respective slots 70 without actuation thereof into the released position. Similarly a downward movement of the upright members only causes downward sliding movement of the upper latch assemblies into the released position while the coupling pins of the lower latch assemblies are merely slidably displaced within the respective lower slots without actuation of the lower latch assemblies into the released position.

The upright members 66 are arranged to be retained in any one of the neutral position or the first and second released positions. This is provided by a retainer arm 72 which projects laterally outward through a corresponding slot in the surrounding side member 30 within which the upright member is received. A pair of fixed flanges 74 are mounted externally on the side member 30 in alignment with the vertical slot within which the retainer arm is permitted to be vertically slidable between the neutral and released positions. An aperture in the retainer arm 72 is arranged for alignment with a respective one of a plurality of cooperating apertures in the fixed members 74 in each one of the neutral position, the first released position and the second released position so that a pin inserted through the cooperating apertures retains the upright member in the selected position as may be desired. Alternatively a lock may be inserted through the cooperating apertures to lock the end gate panel in the neutral position or other positions as may be desired.

The actuator further comprises a connecting member 76 which extends through the lower frame members of the dump box frame in a lateral direction below the bed floor of the dump box for connection between the latch assemblies at the two opposing sides of the gate opening. The connecting member 76 is spaced forwardly of the two upright members and supports a crank arm 78 at each end thereof. Each of the crank arms extends generally horizontally rearward in the neutral position from a forward end fixed on the connecting member to a rear end which is pivotally coupled to the bottom end of the respective one of the upright members 66.

The connecting member 76 is supported for rotation about a longitudinal axis thereof extending in the lateral direction such that the crank arms 78 are pivotal therewith about the axis of the connecting member. When the connecting member is rotated in a first direction from the neutral position both upright members are displaced upwardly with the respective crank arms 78 to release the two lower latch assemblies and permit the end gate panel to be pivoted upwardly. When the connecting member is rotated in an opposite direction about the longitudinal axis thereof, the two upright members are instead displaced downwardly with the respective crank arms to instead release the two upper latch assemblies.

A single actuator handle 80 is mounted at one end of the connecting member 76 so as to extend rearward therefrom in a generally horizontal orientation in the neutral position of the end gate assembly. The handle 80 is oriented generally radially in relation to the axis of the connecting member so as to rotate in two opposing directions with the connecting member about the long axis thereof from the neutral position to either one of the first released position or the second released position respectively. The connecting member 76 ensures that the upper latch assemblies are always released together and the lower latch assemblies are always released together. Upward displacement of the free end of the actuator handle releases the lower latch assemblies such that the end gate panel is pivotal about an upper pivot axis thereof. Similarly downward movement of the free end of the actuator handle releases the upper latch assemblies so that the gate panel is pivotal downwardly about the lower pivot axis.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An end gate assembly for a cargo box comprising a bed floor extending in a longitudinal direction between a front end and a rear end, a pair of sidewalls extending in the longitudinal direction along opposing sides of the bed floor to respective rear ends defining a gate opening therebetween at the rear end of the bed floor, the end gate assembly comprising:

an end gate panel arranged to span between opposing ends in a lateral direction across the gate opening between the rear ends of the sidewalls of the cargo box;

a pair of upper latch assemblies arranged to couple respective opposing ends of the end gate panel to respective ones of the rear ends of the sidewalls adjacent a top of the end gate panel in a latched position of the upper latch assemblies;

a pair of lower latch assemblies arranged to couple respective opposing ends of the end gate panel to respective ones of the rear ends of the sidewalls adjacent a bottom of the end gate panel in a latched position of the lower latch assemblies;

an actuator comprising a single actuator handle supported at one end of the gate opening;

said single actuator handle being coupled to the upper latch assemblies and said single actuator handle being coupled to the lower latch assemblies;

said single actuator handle including a neutral position in which both the upper and lower latch assemblies are in the latched position;

said single actuator handle being movable from the neutral position in a first direction towards a first released position in which the pair of upper latch assemblies are both released from the latched position responsive to said single actuator handle being displaced into the first released position such that the end gate panel is pivotal about a lower pivot axis spanning in the lateral direction across the bottom of the end gate panel between the lower latch assemblies in the first released position; and said single actuator handle being movable from the neutral position in a second direction opposite to the first direction towards a second released position in which the pair of lower latch assemblies are both released from the latched position responsive to said single actuator handle being displaced into the second released position such that the end gate panel is pivotal about an upper pivot axis spanning in the lateral direction across the top of the end gate panel between the upper latch assemblies in the second released position.

2. The assembly according to claim 1 wherein the actuator includes a connecting member connected between the upper and lower latch assemblies on one side of the gate opening and the upper and lower latch assemblies on the other side of the gate opening, the connecting member being arranged to extend across the gate opening below the bed floor of the cargo box.

3. The assembly according to claim 2 wherein the connecting member is rotatable between the neutral position and the released positions about a longitudinal axis of the connecting member which extends in the lateral direction of the upper and lower pivot axes.

4. The assembly according to claim 2 wherein the cargo box comprises lower frame members supporting the bed floor thereon and wherein the connecting member is arranged to extend through the lower frame members.

5. The assembly according to claim 1 wherein the end gate panel comprises an upper pivot shaft projecting laterally outward from each end of the end gate panel adjacent the top thereof and a lower pivot shaft projecting laterally outward from each end of the end gate panel adjacent the bottom thereof, the upper pivot shafts being received in the upper latch assemblies in the latched position thereof to define the upper pivot axis and the lower pivot shafts being received in the lower latch assemblies in the latched position thereof to define the lower pivot axis.

6. The assembly according to claim 5 wherein each latch assembly comprises a fixed portion and a movable portion arranged to selectively retain the respective pivot shaft on the fixed portion, the movable portion being vertically slidable from the latched position to a respective released position.

7. The assembly according to claim 5 wherein the actuator comprises an upright member supported at each end of the end gate panel in connection between a respective one of the upper latch assemblies and a respective one of the lower latch assemblies, each upper latch assembly being movable into the released position only when the respective upright member of the actuator is displaced downwardly and each lower latch assembly being movable into the released position only when the respective upright member of the actuator is displaced upwardly.

8. The assembly according to claim 7 wherein actuator further comprising a connecting member spanning in the lateral direction between opposing sides of the gate opening below the bed floor and a crank arm at each end of the connecting member which is coupled to a respective one of the upright members such that pivotal movement of the connecting member in a first direction from the neutral position causes downward displacement of the upright members into the first released position and such that pivotal movement of the connecting member in a second direction from the neutral position causes upward displacement of the upright members into the second released position.

9. The assembly according to claim 5 wherein each upper latch assembly comprises a fixed portion having a slot extending generally horizontally outward in the longitudinal direction of the cargo box so as to be arranged to slidably receive the respective pivot shaft therein as the end gate panel is pivoted about the lower pivot axis into a closed position spanning the gate opening and a movable portion arranged to selectively retain the respective pivot shaft in the slot in the fixed portion, the movable portions of the upper latch assemblies being movable together into the first released position by the actuator.

10. The assembly according to claim 9 wherein the movable portions of the upper latch assemblies are vertically slidable upwardly into the latched position and downwardly into respective released positions.

11. The assembly according to claim 9 wherein the movable portions of the upper latch assemblies are biased into the latched position.

12. The assembly according to claim 11 wherein the movable portion of each upper latch assembly comprises a cam face arranged to displace the movable portion against the biasing into the released position as the respective pivot shaft is returned to the closed position of the end gate panel.

13. The assembly according to claim 5 wherein each lower latch assembly comprises a fixed portion having a slot extending generally horizontally outward in the longitudinal direction of the cargo box so as to be arranged to slidably receive the respective pivot shaft therein as the end gate panel is pivoted about the upper pivot axis into a closed position spanning the gate opening and a movable portion arranged to selectively retain the respective pivot shaft in the slot in the fixed portion, the movable portions of the lower latch assemblies being movable together into the second released position by the actuator.

14. The assembly according to claim 13 wherein the movable portions of the lower latch assemblies are vertically slidable downwardly into the latched position and upwardly into respective released positions.

15. The assembly according to claim 13 wherein the movable portions of the lower latch assemblies are biased into the latched position.

16. The assembly according to claim 15 wherein the movable portion of each lower latch assembly comprises a cam face arranged to displace the movable portion against the biasing into the released position as the respective pivot shaft is returned to the closed position of the end gate panel.

17. The assembly according to claim 1 in combination with a cargo box comprising a dump box including a base frame arranged to be fixed in relation to a respective vehicle frame and a dump box frame supporting the bed floor for pivotal movement relative to the base frame between a transport position and a dumping position.

18. The assembly according to claim 17 wherein the actuator includes a connecting member connected between the upper and lower latch assemblies on one side of the gate opening and the upper and lower latch assemblies on the other side of the gate opening, the connecting member being arranged to extend across the gate opening below the bed floor through the dump box frame.

19. An end gate assembly for a cargo box comprising a bed floor extending in a longitudinal direction between a front end and a rear end, a pair of sidewalls extending in the longitudinal direction along opposing sides of the bed floor to respective rear ends defining a gate opening therebetween at the rear end of the bed floor, the end gate assembly comprising:

an end gate panel arranged to span between opposing ends in a lateral direction across the gate opening between the rear ends of the sidewalls of the cargo box;

a pair of upper latch assemblies arranged to couple respective opposing ends of the end gate panel to respective ones of the rear ends of the sidewalls adjacent a top of the end gate panel in a latched position of the upper latch assemblies;

a pair of lower latch assemblies arranged to couple respective opposing ends of the end gate panel to respective ones of the rear ends of the sidewalls adjacent a bottom of the end gate panel in a latched position of the lower latch assemblies;

an actuator coupled to the upper latch assemblies and the lower latch assemblies;

the actuator being movable from a neutral position in which the upper and lower latch assemblies are in the latched position in opposing directions towards a first released position and a second released position respectively;

said actuator being arranged to release both upper latch assemblies in the first released position such that the end gate panel is pivotal about a lower pivot axis spanning in the lateral direction across the bottom of the end gate panel between the lower latch assemblies; and said actuator being arranged to release both lower latch assemblies in the second released position such that the end gate panel is pivotal about an upper pivot axis spanning in the lateral direction across the top of the end gate panel between the upper latch assemblies;

wherein the actuator includes a connecting member connected between the upper and lower latch assemblies on one side of the gate opening and the upper and lower latch assemblies on the other side of the gate opening;

wherein the connecting member extends across the gate opening below the bed floor of the cargo box; and wherein the connecting member is rotatable about a longitudinal axis of the connecting member from the neutral position in a first direction towards the first released position and from the neutral position in a second direction opposite to the first direction towards the second released position in which the longitudinal axis extends in the lateral direction of the upper and lower pivot axes.

20. An end gate assembly for a cargo box comprising a bed floor extending in a longitudinal direction between a front end and a rear end, a pair of sidewalls extending in the longitudinal direction along opposing sides of the bed floor to respective rear ends defining a gate opening therebetween at the rear end of the bed floor, the end gate assembly comprising:

an end gate panel arranged to span between opposing ends in a lateral direction across the gate opening between the rear ends of the sidewalls of the cargo box;

a pair of upper latch assemblies arranged to couple respective opposing ends of the end gate panel to respective ones of the rear ends of the sidewalls adjacent a top of the end gate panel in a latched position of the upper latch assemblies;

a pair of lower latch assemblies arranged to couple respective opposing ends of the end gate panel to respective ones of the rear ends of the sidewalls adjacent a bottom of the end gate panel in a latched position of the lower latch assemblies;

an actuator coupled to the upper latch assemblies and the lower latch assemblies;

the actuator being movable from a neutral position in which the upper and lower latch assemblies are in the latched position in opposing directions towards a first released position and a second released position respectively;

said actuator being arranged to release both upper latch assemblies in the first released position such that the end gate panel is pivotal about a lower pivot axis spanning in the lateral direction across the bottom of the end gate panel between the lower latch assemblies; and said actuator being arranged to release both lower latch assemblies in the second released position such that the end gate panel is pivotal about an upper pivot axis spanning in the lateral direction across the top of the end gate panel between the upper latch assemblies;

wherein the end gate panel comprises an upper pivot shaft projecting laterally outward from each end of the end gate panel adjacent the top thereof and a lower pivot shaft projecting laterally outward from each end of the end gate panel adjacent the bottom thereof, the upper pivot shafts being received in the upper latch assemblies in the latched position thereof to define the upper pivot axis and the lower pivot shafts being received in the lower latch assemblies in the latched position thereof to define the lower pivot axis;

wherein the actuator comprises two upright members supported at respective opposing ends of the end gate panel such that each upright member is in connection between a respective one of the upper latch assemblies and a respective one of the lower latch assemblies;

wherein the upper latch assemblies are only releasable from the latched position when said upright members are displaced downwardly from the neutral position towards the first released position; and wherein the lower latch assemblies are only releasable from the latched position when said upright members are displaced upwardly from the neutral position towards the second released position.

* * * * *